April 18, 1933. D. H. BENNETT 1,903,753
CUTTER MECHANISM FOR MOWING MACHINES
Filed Sept. 28, 1932 2 Sheets-Sheet 1
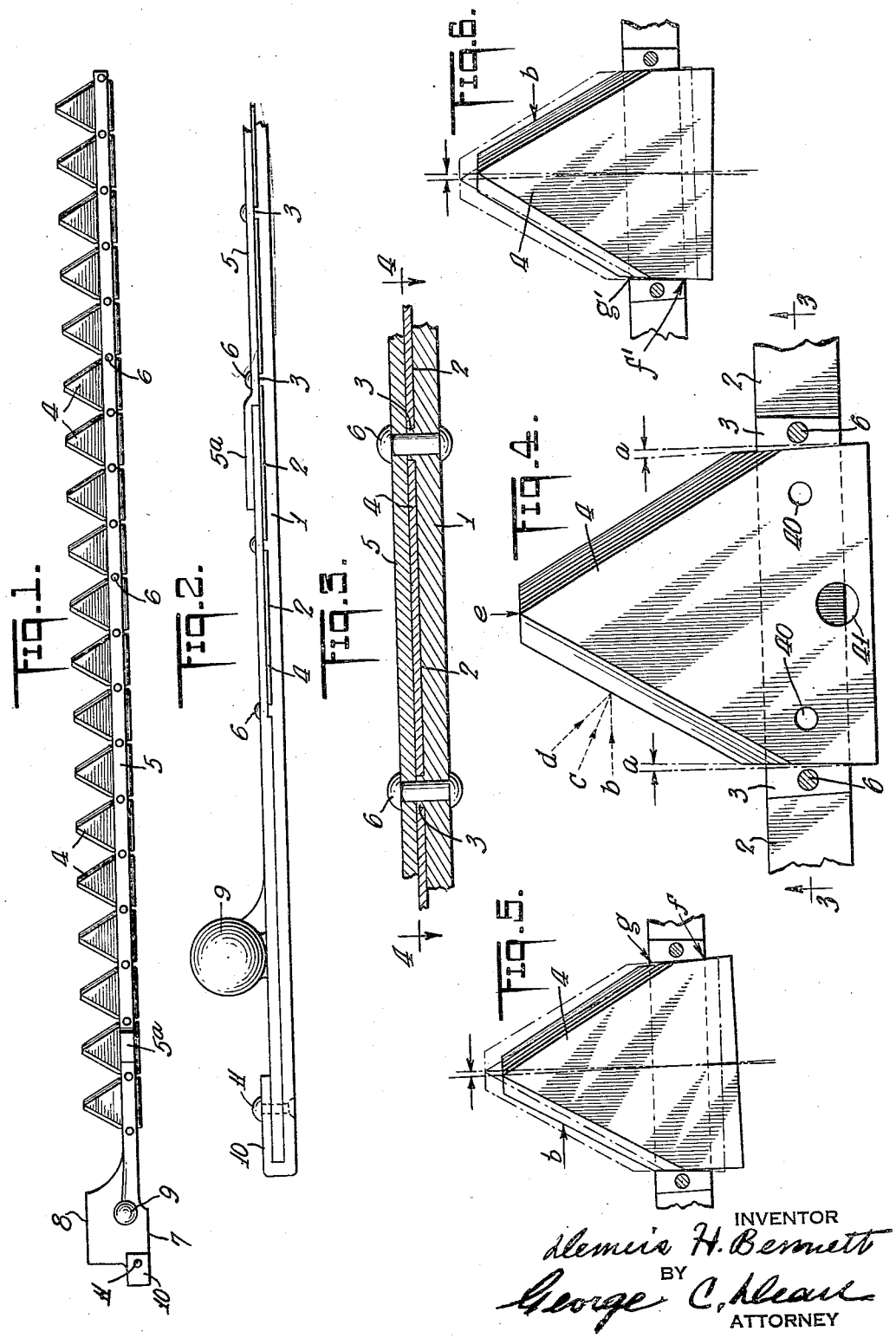

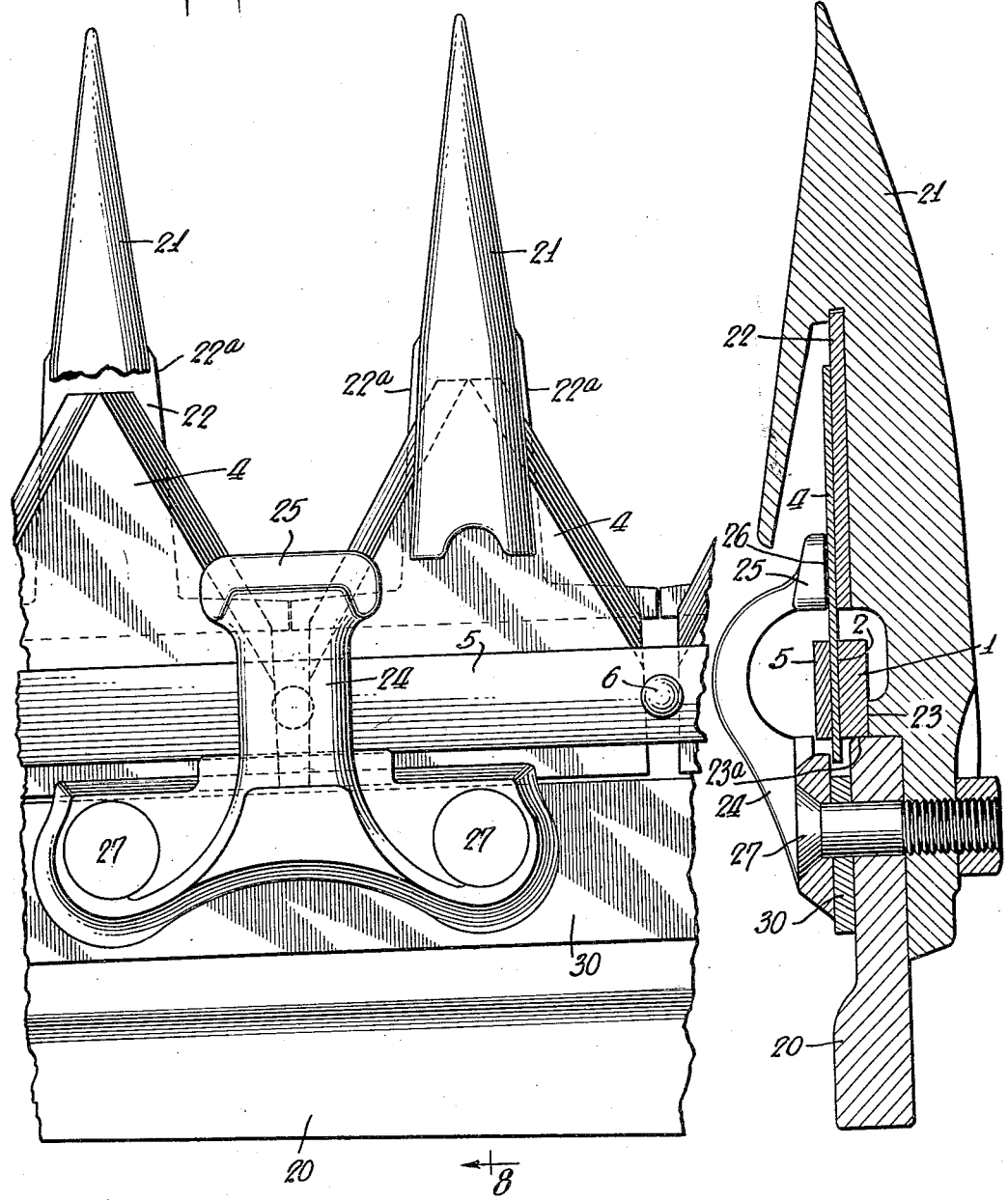

Patented Apr. 18, 1933

1,903,753

UNITED STATES PATENT OFFICE

DENNIS H. BENNETT, OF DORR, MICHIGAN, ASSIGNOR OF ONE-THIRD TO DEAN HALFORD AND ONE-THIRD TO WALTER E. IHLING, BOTH OF KALAMAZOO, MICHIGAN

CUTTER MECHANISM FOR MOWING MACHINES

Application filed September 28, 1932. Serial No. 635,146.

My present invention concerns mowing machines of the conventional type commonly used for cutting grain, hay and the like. In such machines, the cutting is done by oppositely slanting edges of blades carried by an endwise slidable cutter bar reciprocated in a guide member having laterally slotted guard fingers the bottoms of which are formed or provided with fixed shear plates that cooperate with the slanting edges of the moving blades, to shear the stalks of the grain or hay that are brought between them by the forward motion of the machine.

My invention relates more particularly to cutter bars having detachable blades which are adapted for use in mowing machines of the above type. It embodies features that were primarily the result of discoveries made in the course of many experiments and modifications that grew out of a detachable-blade cutter-bar, for which I was granted Patent No. 394,441, dated December 11, 1888.

In these machines, the cutter bar movements and reversals of movement, must be very rapid in order that the blades may laterally engage and shear all the stalks between the guard fingers, before they can be flattened down out of reach by the forward motion of the machine. Even when running over bare ground, this will set up vibratory stresses tending to shake the blades loose from the bar. Furthermore, very severe direct stresses are applied to the diagonally presented cutting edges of each blade when it encounters the resistance of the material being cut, particularly when the material happens to be tough grass, alfafa, weeds or bushes. This resistance is applied at a sharp angle to the cutting edge, so that the resultant effect on the blade is an edgewise tilting force and also as a powerful rearward wedging force. Occasionally also direct rearward thrust is applied to the blade by endwise impact of the blade upon stones, and other obstructions in the path of the cutter.

Consequently, in all commercial mowing machines with which I am familiar, it has been the practice to lock the blade to the bar positively and rigidly so that it solidly and unyieldingly resists rearward wedging as well as lateral tilting forces; and for many years it has been accepted standard practice to solidly rivet each blade to the cutter bar by two widely spaced rivets. The cutting edges of these riveted blades diverge at an acute angle, so that it is difficult and more or less dangerous to sharpen them by hand, and it is even more difficult to manipulate the bar so that the edges may be properly sharpened on a grindstone. Moreover, in practice, the rivets fail to prevent the blades from working loose and when this happens or when the blade becomes worn or damaged, it requires much time and labor to remove the old rivets and to rivet a new blade in place. Consequently, it is common practice to have two, or three, and sometimes more, cutter bars for each machine in use.

For these reasons, many arrangements have been devised for securing the blades to the bar detachably, so that they can be readily replaced, but so far as I am aware, all such devices, including my own patented device, have means intended to positively and rigidly lock the blades to the bar, as against any and all rearward shocks and stresses; and all of them have proved defective or impractical, as compared with the simple, solid riveting above described.

My prior patent referred to centers on means carried by the cutter bar, for preventing rearward movement of the blade, the preferred means being a screw screwed into the rear of the cutter bar, with its head screwed into engagement with a rear end surface of the blade, whereby the blades are wedged in seats that "diverge or widen toward the rear and the knives are correspondingly formed", the essential being that the knives to be held by the rear screw head "are only movable into their seats from the rear".

The screw and head, being on the cutter bar, cannot be made strong enough nor locked in place tightly enough to hold securely against displacement by the violent rearward thrusts that may be applied to the blade when cutting; and the head may be rotated or unscrewed even by vibration to which the bar is subjected when the machine travels over bare ground.

My present commercially perfected device embodies and depends upon certain paradoxical mechanical effects that I have discovered can be developed and made effective by certain modifications and changes in accordance with my present invention. The paradoxical effect is that though the blade is held by rearwardly diverging edges; and though it is free to be driven rearwardly; and though the forces acting on the blade during the cutting operation, certainly exert a powerful rearward thrust on the cutter bar, and may force a blade rearwardly; nevertheless, the lateral or tilting effect on each blade, if utilized in accordance with my invention, will operate to force the blade forward into tightly wedged position.

In my present device, I employ no means whatever for locking the blade against rearward movement. It is seated in the cutter bar in such a way that it can be inserted only from the rear, but there is nothing on the cutter bar, or anywhere else, to prevent its being driven rearwardly a substantial distance; such rearward displacement is limited by a stationary safety bar on the cutter bar guide, extending along the rear of all the blades, parallel with the bases thereof.

The blades are limited in their forward movement by suitable forward taper of the edge walls of the blades and sockets, and this taper may be so small as to be unnoticeable to the eye. However, the taper must be great enough to prevent danger of the blade working forward through its socket, and in practice should be great enough to facilitate ready rearward removal of the blade; also the greater the taper, the less accurately it is necessary to size and fit the seats and the edges of the blades in order to have the rear edges of the blades come into approximate alignment, when they are driven or are caused to creep, into tight wedging engagement, by the working stresses above referred to.

By making the cutter bar of ordinary "blown" iron with side walls of the sockets slightly undersize, and driving into the seats a standard taper blade or equivalent steel mandrel, the edge taper and width of the sockets may be easily standardized so that only accurate grinding of the edges of the blades is necessary, even when the taper at each edge is as slight as 1 in 128. While much greater taper is possible, there is a limit beyond which the forward creeping reaction above referred to will not occur, particularly where the cutter bar is of material much harder, or more slippery, than the ordinary blown iron above referred to; and the greatest edge taper I have ever tried with any material is 1 in 16.

In my patent the edge seats are in upstanding transverse "lugs or projections" which hold the blades down merely by having the edges of the projection slightly undercut, whereas in my present device, the edge seats are merely ribs with vertical sides; and the blades are held down by a bar extending entirely across their top surfaces. This bar, even though of considerably less thickness than the seat bar, is advantageous in that it makes a much stiffer cutter bar, which is less easily bent; and the blades are less easily displaced when the bar is removed from the machine. Moreover, I find frictional engagement, entirely across both faces of each blade, tends to steady the forward creeping action of the blades after they have been displaced rearwardly; and also to hold the blades in place when the bar is removed from the machine.

Another advantage of this strip is that one end may be made to overlap and safely anchor the so-called "knife head" which carries the lateral guides and the ball joint through which the cutter blade is reciprocated. The other end of the knife head is similarly anchored by turning over and riveting through it the end of the seat bar.

The above and other features of my invention and the discoveries upon which it is based, may be more fully understood from the following description in connection with the accompanying drawings, in which Fig. 1 is a top plan view of a cutter bar such as contemplated by my invention;

Fig. 2 is a rear edge view on a large scale, showing the preferred method of securing the knife head to the cutter bar;

Fig. 3 is a vertical longitudinal section on a still larger scale, on the line 3—3, Fig. 4;

Fig. 4 is a plan view on the line 4—4, Fig. 3;

Figs. 5 and 6 are views like Fig. 4, but on a smaller scale and showing the knife displaced rearwardly, and laterally tilted in its seat;

Fig. 7 is a detailed view on a large scale, showing my cutter bar and two of its blades, in place in the machine; and Fig. 8 is a vertical section on the line 8—8, of Fig. 7.

In these drawings, the bar 1 is shown as formed with bottom seats 2, 2, and with integral ribs 3, 3, the sides of which are the edge seats for the blades 4, 4. The blade sockets are completed by the bar 5 which engages upper surfaces of the blades, and is secured by rivets 6 extending through the ribs 3 which form the edge seats for the blades. Preferably two end sockets are completed by the "knife head" which is of conventional construction, comprising the rear edge guide 7, the front guide and tilt preventer 8 and the ball 9 which forms the knife member of a ball and socket joint through which the cutter blade is reciprocated, by the usual mechanism, not shown.

These knife heads cause much trouble by tearing loose from their rivets and one feature of my invention includes extending the socket bar 1, bending it upward so as to form an abutment for the end of the knife head; preferably also bending it forwardly, as at 10, and preferably securing it by a rivet 11 which has its head counter-sunk in the lower surface of the seat bar and its upper end riveted as shown in Fig. 2. This knife head preferably extends over the first two of the adjacent blades 4, and is secured to the bar by rivets 6 between the blades; also at its free end by the overlapped portion 5a of the top clamping bar.

As shown in Fig. 4, the blade 4 has a projecting portion formed with oppositely presented cutting edges which in this case are each inclined at an angle of 60° to the direction of endwise reciprocation of the cutter bar. As indicated by the dotted lines and arrows $a$, $a$, the edges of the blades, and the seats therefor are tapered forwardly. In order to make it clear to the eye that the taper is an essential feature of my invention, that indicated at $a$ is much greater than the preferred taper of 1 in 128 or even 1 in 64, either of which is entirely practical for the purpose of preventing the blade from being driven too far forward in its socket.

In operation, the inclined cutting edge of each blade encounters the resistance of the stalks to be cut, at varying angles, the most obvious being its angle to the endwise movement of the cutter bar, which in this case is 60° as indicated by arrow $b$; plus a further angle due to the slant of the stationary edge against which the stalks are sheared; plus a variable angle due to the forward movement of the whole machine. The forward movement of the machine is constant, but that of the knife varies between low speeds at the beginning and end of each stroke, to relatively high speed at the middle of the stroke. Consequently, the engagement of the cutting edge with the stalks will be more nearly endwise of the blades at the beginning and end of each stroke. The relations, but not the sizes of these variable angles are indicated by arrow $d$ as compared with $c$. Obviously, the rearward component of these high angle resistances is often very great. Moreover, the forward movement of the machine causes occasional more or less endwise impacts of the blade against stones or similar obstructions, particularly at the blunt end, as indicated by the arrow $e$.

In view of these conditions, my invention contemplates allowing the endwise forces to force the blade rearwardly, if and when they will, but it is evident that practical success depends on utilizing my discovery as to the fact, and as to the conditions under which the blades may be made to creep forward.

The factors favorable to forward creep can be observed and described much more easily than how and why it occurs. One factor seems to be that the length of the blade socket, crosswise of the cutter bar, is very small as compared with its width between the walls in which the blades are wedged, so that as crudely indicated in Figs. 5 and 6, any looseness permitting edgewise tilt of the blade, will result in substantially more rearward movement for one side edge of the blade than for the other, so that the blade easily becomes cocked in its socket. A vital point is that the edge taper of the blades and seats must not be too great; otherwise any tilting will wedge the blade rearward. Another vital point is to have the wedge taper of the blades and sockets, the sole means for limiting forward creep of the blades. A favoring factor is having both faces of the blades clamped so that the blades will be momentarily held in the cocked position until the direction of reciprocation reverses. Another condition seems to be that if and when the knife is displaced rearwardly, its rearward movement should be limited so that the corner where the cutting edge runs into the clamping edge, will not retreat into the socket sufficiently to dig into the side walls.

When enough of the above factors are favorable, a rearwardly displaced blade certainly creeps forward automatically during operation of the knife, against all ordinary working resistance until the knife is tightly rewedged in its socket. My explanation is that when displaced rearwardly a cutting stroke in one direction cocks it as shown in Fig. 5. Being frictionally held in that position, the next stroke tilts it in the opposite direction, first about corner $f$ as a fulcrum; then about corner $g$, as a fulcrum; until it is cocked in the opposite direction, as shown in Fig. 6. Obviously, if there has been no slip on fulcrum corners $f$ and $g$, the cocking point at $f'$, Fig. 6, will be further back on the blade than was the cocking point $f$ in Fig. 5. On this theory it is evident that successive strokes cocking the blade alternately in opposite direction, would work it forward, even if there is some slip on fulcrums $f$ or $g$, unless the slip is greater than the theoretical forward shifting of cocking points.

Whatever the theory and whatever the operation, I am certain that the angle of rearward divergence of the walls of the sockets must not be too great, for otherwise the blades will not come forward.

Figs. 7 and 8 show the above described cutter bar and blades in position in guides of conventional construction. The main beam 20 which supports the cutter mechanism, knife guard 21 provided with stationary shear plate 22, horizontal guide surface 23 for the cutter bar, the rear surface 23a for taking the rearward thrust on the cutter bar, and the knife clip 24, having a foot 25 with a flat lower guide surface 26 to prevent lifting of the blade 4 as it shears the stalks against edges 22a, may be substantially the same as in standard constructions now in use. An important difference is that whereas in commercial machines the rear edges of the blades are backed by contacting separate relatively short wear plates, one at each knife clip, I employ a continuous bar 30 extending the entire length of the cutter bar and to the extreme ends of its reciprocation. These are secured between the knife clip 24 and beam 20, the same bolts 27 being used to hold all of these parts in assembled position.

An important point to know is that when the cutter bar, with the blades in place therein, is in position in the above support assembly, the rear end of the blade 4 is a substantial distance in advance of the safety strips 30 so that it is free to yield rearwardly a substantial distance whenever the forces hereinabove described are sufficiently violent or take effect in a direction that makes it desirable for the b'ade to yield slightly by rearward movement. The permissible rearward movement as shown is less than that indicated in Figs. 5 and 6, and permits retreat of the blade only to a position where it is easily and quickly restored to its forward tightly wedged position by continued normal operation of the cutter.

An advantage of the specific arrangement and portions of parts shown in Figs. 5 and 6 is that it makes it possible to use my cutter bar as a substitute for the bar with riveted blades, in well known commercial models of mowing machines now in use. It is only necessary to take out the bolts 27, remove each of the relatively short wear plates that engage the rear of the blades between the knife clip 24 and the beam 20, substituting therefor my continuous safety bar 30. This bar being slightly thicker than the conventional wear plate, it will be necessary to bend down the foot 25 of the knife clip 24, sufficiently to bring it back into guiding relation to the blade 4; or, if desired, new c'ips, properly proportioned, may be substituted for the old clips.

No other changes are necessary, and my cutter bar with its removable blades may be quickly withdrawn and replaced by precisely the same means now employed for the riveted-blade cutter bars.

In order that my cutter bar may be in all respects an exact substitute for the old cutter bars, the blades 4 are preferably the standard blades now on the market, which can be easily adapted for my purpose merely by accurate grinding of the side edges to fit the taper of the sockets in the bar. In this connection, it is to be noted that the blade shown in the drawings, particularly that shown in Fig. 4, is such a blade, even the original rivet holes being shown at 40, 40. It will be noted also that Fig. 4 shows a third hole 41, centrally located and near enough to the rear edge of the blade so that a tool may be inserted for prying the blade rearwardly out of its socket. While it is possible to loosen the blade by tapping on the blunt end e, this should be avoided or at least carefully done, otherwise the forward end of the cutting edge may be marred. Commercial blades may be modified in other respects to suit the special conditions and modes of operation contemplated by my present invention. As for instance, the rear edge of the blade or its corners may be slightly rounded so that the corners cannot touch the safety bar 30 when the blades are forced rearwardly into contact therewith.

It is to be noted that the commercial blades have their lower faces formed of high quality tool steel backed by milder steel and that as a practical point in manufacture, and even for functioning of a forward creep of the blade, it is desirable to have the bar socket of decidedly softer material than the b'ade, although if the proportions of parts are sufficiently favorable and the machining is sufficiently accurate, iron or steel much harder and more slippery than "blown" iron may be successfully used.

It will be obvious from the foregoing description that many variations and modifications of the specific illustrative form shown in the drawings are possible and are contemplated. For instance, the cutter bar, blades, etc., may be adapted to have use in other commercial models of mowing machines or in newly designed machines having the same or different characteristics and methods for reciprocating the cutter bar.

I claim:

1. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are forwardly tapered and wedge fitted from the rear through a correspondingly tapered transverse socket in the cutter bar, the parts being so proportioned that if displaced rearwardly, the blades will creep forward under normal cutting stresses, in combination with fixed guides for the cutter bar and a fixed safety bar extending along the rear of all of the blades, but spaced rearwardly therefrom so as to permit only limited rearward movement of each blade in its socket, if and when forced rearwardly during operation of the machine.

2. A mowing machine of the class described, including an endwise reciprocating cutter bar carrying a series of wide, thin, transversely-projecting blades, each blade comprising a forwardly projecting cutter portion having oppositely slanting cutting edges and a body portion having side edges that are forwardly tapered and wedge fitted from the rear, through a correspondingly tapered transverse socket in the cutter bar so that the edge taper of the blade extends a substantial distance forwardly as well as rearwardly of the socket, the angle of said edge taper being such that the blades are self seating in their sockets under normal cutting stresses, in combination with fixed guides for the cutter bar, and a fixed safety bar extending along the rear of all of the blades, but spaced rearwardly therefrom, so as to permit only limited rearward movement of each blade in its socket, if and when forced rearwardly during operation of the machine.

3. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are each forwardly tapered and wedge fitted from the rear, through a correspondingly tapered transverse socket in the cutter bar, said edge taper being as small as will safely hold the blade from working forwardly through the socket, in combination with fixed guides for the cutter bar and a fixed safety bar extending along the rear of all of the blades, but spaced rearwardly therefrom so as to permit only limited rearward movement of each blade in its socket, if and when forced rearwardly during operation of the machine.

4. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are each forwardly tapered in a ratio not substantially greater than 1 in 16; and wedge fitted from the rear, through a correspondingly tapered transverse socket in the cutter bar, in combination with fixed guides for the cutter-bar and a fixed safety bar extending along the rear of all of the blades, but spaced rearwardly therefrom so as to permit only limited rearward movement of each blade in its socket, if and when forced rearwardly during operation of the machine.

5. A mowing machine of the class described, including an endwise reciprocating cutter bar carrying a series of wide, thin, transversely-projecting blades, each blade comprising a forwardly projecting cutter portion having cutting edges oppositely slanting at an angle of approximately 60°, and a body portion having side edges that are forwardly tapered and wedge fitted from the rear, in a correspondingly tapered transverse socket in the cutter bar, the angle of said edge taper and the material of the socket bar being such that the blades are rigidly held in their sockets by friction under normal cutting stresses, in combination with fixed guides for the cutter bar, and a fixed abutment spaced rearwardly of the blades, so as to permit only limited rearward movement of each blade in its socket, if and when forced rearwardly during operation of the machine.

6. A mowing machine of the class described, including an endwise reciprocating cutter bar carrying a series of wide, thin, transversely projecting blades, each blade comprising a forwardly projecting cutter portion having cutting edges oppositely slanting and a body portion at an angle of approximately 60°, having side edges that are each forwardly tapered in a ratio approximately 1 in 16; and wedge fitted from the rear, through a correspondingly tapered transverse socket in the cutter bar, in combination with fixed guides for the cutter bar and a fixed safety bar extending along the rear of all of the blades, but spaced rearwardly therefrom so as to permit only limited rearward movement of each blade in its socket, if and when forced rearwardly during operation of the machine.

7. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are forwardly tapered and wedge fitted from the rear through a correspondingly tapered transverse socket in the cutter bar, the parts being so proportioned that the blades will tend to creep forward and firmly wedge themselves under normal cutting stresses, in combination with means permitting loosening of the blades by rearward movement, only to the limited distance through which such forward creeping tendency will be effective.

8. A mowing machine of the class described, including an endwise reciprocating cutter bar carrying a series of wide, thin, transversely-projecting blades, each blade comprising a forwardly projecting cutter portion having oppositely slanting cutting edges and a body portion having side edges that are forwardly tapered and wedge fitted from the rear, through a correspondingly tapered transverse socket in the cutter bar so that the edge taper of the blade extends a substantial distance forwardly as well as rearwardly of the socket, the angle of said edge taper being such that the blades are self seating in their sockets under normal cutting stresses, in combination with means permitting rearward movement of the blade not greater than said distance which the edge taper extends forwardly of the socket.

9. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are each forwardly tapered and wedge fitted from the rear, through a correspondingly tapered transverse socket in the cutter bar, said edge taper being as small as will safely hold the blade from working forwardly through the socket, in combination with means permitting rearward movement of the blade not greater than said distance which the edge taper extends forwardly of the socket.

10. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are each forwardly tapered and wedge fitted from the rear, through a correspondingly tapered transverse socket in the cutter bar, said edge taper being as small as will safely hold the blade from working forwardly through the socket.

11. A mowing machine of the class described, including an endwise reciprocating cutter bar carrying a series of wide, thin, transversely projecting blades, each blade comprising a forwardly projecting cutter portion having oppositely slanting cutting edges and a body portion having side edges that are each forwardly tapered in a ratio not substantially greater than 1 in 16; and wedge fitted from the rear, through a correspondingly tapered transverse socket in the cutter bar.

12. A cutter bar of the class described, comprising an elongated bar of greater width than thickness formed with a flat face having a plurality of similar transverse grooves therein, the bottom and side walls of the grooves forming face seats and edge seats for the blades, the edge seats of the respective grooves converging forwardly toward the same edge of said bar; a knife head including an upstanding bearing whereby the bar may be driven and a base plate, said plate being secured to the grooved bar along its grooved face to afford seats for the upper surfaces of some of the blades at one end of said grooved bar; and a cooperating bar similarly secured to form similar seats for the upper surfaces of the remaining blades, in combination with cutter blades each seated in one of said grooves and having a tapered body portion of size and shape adapted for wedge fitting from the rear into said groove with the blade portion extending beyond that edge of the grooved bar toward which the edge seats of the grooves converge; one end of the grooved bar being bent vertically to form an abutment for the outer end of the base plate of the knife and reversely over the upper surface thereof; and a transversely extending clamping member extending through said face plate and engaging the direct and reversely bent portions of said grooved bar to clamp the base plate between them.

13. A cutter bar of the class described, comprising an elongated bar of greater width than thickness formed with a flat face having a plurality of similar transverse grooves therein, the bottom and side walls of the grooves forming face seats and edge seats for the blades, the edge seats of the respective grooves converging toward the same edge of said bar, and a cooperating bar secured to the grooved bar along its grooved face to afford seats for the upper surfaces of the blades, in combination with cutter blades each seated in one of said grooves and each having a tapered body portion of size and shape adapted for wedge fitting from the rear into said groove, with the blade portion extending beyond that edge of the grooved bar towards which the edge seats of its groove converge.

14. A cutter bar assembly adapted for operation by endwise reciprocation in suitable guides, said assembly including a bar formed with a series of transverse sockets, and a series of wide, thin, transversely projecting blades, each blade comprising a forwardly projecting cutter portion having oppositely slanting cutting edges and a body portion having non-cutting side edges that are forwardly tapered and wedge fitted from the rear through one of the transverse sockets in the bar, such socket being formed with forwardly converging edge seats for wedge fit and frictional holding of said forwardly tapered side edges; the parts being proportioned and arranged so that each blade is held against loosening movement, non-positively, and solely by forward wedging friction and so that in operation the normal cutting stresses cause the blade to creep forward and rewedge itself if loosened.

Signed at Moline, in the county of Allegan and State of Michigan, this 26th day of September, A. D. 1932.

DENNIS H. BENNETT.